United States Patent
Höglund et al.

(10) Patent No.: US 12,302,220 B2
(45) Date of Patent: May 13, 2025

(54) TRANSPORT BLOCK SIZE SELECTION FOR EARLY DATA TRANSMISSION

(71) Applicant: Telefonaktiebolaget LM Ericsson (publ), Stockholm (SE)

(72) Inventors: Andreas Höglund, Solna (SE); Johan Bergman, Stockholm (SE); Yutao Sui, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 186 days.

(21) Appl. No.: 17/044,381

(22) PCT Filed: Apr. 4, 2019

(86) PCT No.: PCT/IB2019/052789
§ 371 (c)(1),
(2) Date: Oct. 1, 2020

(87) PCT Pub. No.: WO2019/193552
PCT Pub. Date: Oct. 10, 2019

(65) Prior Publication Data
US 2021/0144623 A1    May 13, 2021

Related U.S. Application Data

(60) Provisional application No. 62/653,451, filed on Apr. 5, 2018.

(51) Int. Cl.
*H04W 48/10* (2009.01)
*H04L 1/18* (2023.01)
(Continued)

(52) U.S. Cl.
CPC ............ *H04W 48/10* (2013.01); *H04L 1/18* (2013.01); *H04W 28/06* (2013.01); *H04W 48/16* (2013.01); *H04W 74/08* (2013.01)

(58) Field of Classification Search
CPC ..... H04W 48/10; H04W 28/06; H04W 48/16; H04W 74/08; H04L 1/18
(Continued)

(56) References Cited

U.S. PATENT DOCUMENTS

2019/0159197 A1* 5/2019 Shrestha ........... H04W 74/0866
2019/0159257 A1   5/2019 Rico Alvarino et al.
(Continued)

FOREIGN PATENT DOCUMENTS

CN    101379747 A    3/2009
CN    102118793 A    7/2011
(Continued)

OTHER PUBLICATIONS

Russian Office Action issued for Application No. 2020134142—Feb. 8, 2021.
(Continued)

*Primary Examiner* — Chuck Huynh
(74) *Attorney, Agent, or Firm* — Baker Botts L.L.P.

(57) ABSTRACT

A method is performed by a wireless device for early data transmission. The method comprises receiving a broadcast from a network node. The broadcast indicates a maximum transport block size for early data transmission and a number of transport block size candidates. The method further comprises selecting a transport block size for early data transmission. The transport block size is selected based on a table entry that corresponds to the maximum transport block size and the number of transport block size candidates. The method further comprises transmitting uplink data in one or more transport blocks. Each transport block has the selected transport block size.

22 Claims, 4 Drawing Sheets

(51) Int. Cl.
*H04W 28/06* (2009.01)
*H04W 48/16* (2009.01)
*H04W 74/08* (2009.01)

(58) Field of Classification Search
USPC .......................................................... 370/329
See application file for complete search history.

(56) References Cited

U.S. PATENT DOCUMENTS

2019/0215872 A1    7/2019  Park et al.
2019/0306873 A1*  10/2019  Lin ................... H04W 74/0833

FOREIGN PATENT DOCUMENTS

| CN | 105659517 A   | 6/2016  |
| CN | 110351833 A   | 10/2019 |
| CN | 112055418 A   | 12/2020 |
| EP | 3664554 A1    | 6/2020  |
| NC | 20170012701   | 1/2017  |
| NC | 20180003953 A1| 5/2017  |
| RU | 2 573 644 C1  | 1/2016  |
| WO | 2015160291 A1 | 10/2015 |

OTHER PUBLICATIONS

3GPP TSG RAN WG2 Meeting #101; Athens, Greece; Title: Reply LS to RAN1 on early data transmission; Source: RAN2; To: RAN1 (R2-1803884)—Feb. 26-Mar. 2, 2018.
Japanese Office Action issued for Application No. 2020-553499—Nov. 30, 2021.
3GPP TSG RAN WG1 Meeting #92bis; Sanya, China; Source: MediaTek Inc.; Title: Early Data Transmission TBS Determination; Document for: Discussion and Decision (R1-1804143)—Apr. 16-20, 2018.
3GPP TSG-RAN2 Meeting #101; Athens, Greece; Change Request; Title: Introduction of further NB-IoT enhancements in 36.306; Source to WG: Ericsson; Source to TSG: R2 (R2-1803007 (Revision of R2-1713690))—Feb. 26-Mar. 2, 2018.
PCT Notification of Transmittal of the International Preliminary Report on Patentability issued for International application No. PCT/IB2019/052789—Feb. 28, 2020.
PCT International Search Report issued for International application No. PCT/IB2019/052789—Aug. 5, 2019.
PCT Written Opinion of the International Seraching Authority issued for International application No. PCT/IB2019/052789—Aug. 5, 2019.
3GPP TSG RAN WG1 Meeting #92; Athens, Greece; Source: Huawei, HiSilicon; Title: Feature lead summary of EDT during RACH in feNB-IoT (R1-1803007)—Feb. 26-Mar. 2, 2018.
3GPP TSG-RAN WG2 #101; Athens, Greece; Source: Ericsson; Title: Report on [100#38] [ MTC/NB-IoT] Padding issue in Msg3 (R2-1803077)—Feb. 26-Mar. 2, 2018.
Russian Decision on the Grant issued for Application No. 2020134142/07 (062585)—Jun. 5, 2021.
3GPP TS 36.331 v14.4.0; Technical Specification; 3rd Generation Partnership Project; Technical Specification Group Radio Access Network; Evolved Universal Terrestrial Radio Access (E-UTRA); Radio Resource Control (RRC); Protocol Specification (Release 14)—Sep. 2017.
3GPP TSG RAN WG2 Meeting #100; Reno, Nevada, USA; Title: On NB-IoT EDT indication via PRACH; Source: MediaTek Inc. (R2-1713679)—Nov. 27-Dec. 1, 2017.
3GPP TSG-RAN WG2 #100; Reno, Nevada, USA; Source: Sierra Wireless S.A.; Title: PRACH for EDT requests (R2-1713862)—Nov. 27-Dec. 1, 2017.
First Office Action issued by China National Intellectual Property Administration for Application No. 201980022254.4—Sep. 21, 2022.
Office Action issued for Colombian Application No. NC2020/0011975—Jun. 29, 2023.

* cited by examiner

TRANSPORT BLOCK SIZE SELECTION FOR EARLY DATA TRANSMISSION

RELATED APPLICATIONS

This application claims the benefit of Provisional Application Ser. No. 62/653,451, filed on Apr. 5, 2018 and entitled "System Information Indication for Multiple TBS Selection for Early Data Transmission," the contents of which are incorporated by reference herein in their entirety.

PRIORITY

This nonprovisional application is a U.S. National Stage Filing under 35 U.S.C. § 371 of International Patent Application Serial No. PCT/IB2019/052789 filed Apr. 4, 2019 and entitled "TRANSPORT BLOCK SIZE SELECTION FOR EARLY DATA TRANSMISSION" which claims priority to U.S. Provisional Patent Application No. 62/653,451 filed Apr. 5, 2018 both of which are hereby incorporated by reference in their entirety.

TECHNICAL FIELD

Certain embodiments of the present disclosure relate, in general, to wireless communications and, more particularly, to transport block size selection for early data transmission.

BACKGROUND

Work has continued in certain standards bodies to specify technologies to cover Machine-to-Machine (M2M) and/or Internet of Things (IoT) related use cases. For example, the most recent work for $3^{rd}$ Generation Partnership Project (3GPP Release 13 and 14 include enhancements to support Machine-Type Communications (MTC) with new User Equipment (UE) categories (Cat-M1, Cat-M2), supporting reduced bandwidth of up to 6 and 24 physical resource blocks (PRBs), and Narrowband IoT (NB-IoT) UEs providing a new radio interface (and UE categories Cat-NB1 and Cat-NB2).

Herein, the Long Term Evolution (LTE) enhancements introduced in 3GPP Release 13, 14, and 15 for MTC may be referred to as "eMTC" a.k.a. LTE-M a.k.a. Bandwidth reduced Low complexity (BL) or Coverage Enhancement (CE) UEs, including (not limiting) support for bandwidth limited UEs, Cat-M1, and support for coverage enhancements. This is to separate discussions from NB-IoT (notation here used for any Release), although the supported features are similar on a general level.

For both enhanced MTC and NB-IoT, 'Cellular IoT (CIoT) Evolved Packet System (EPS) User Plane (UP) optimization' and 'CIoT EPS Control Plane (CP) optimization' signalling reductions were also introduced in Rel-13. The former, here referred to as UP-solution, allows the UE to resume a previously stored Radio Resource Control (RRC) connection (thus also known as RRC Suspend/Resume). The latter, here referred to as CP-solution, allows the transmission of user-plane data over Non-Access Stratum (NAS) (aka downlink NAS (DoNAS)).

For 3GPP Release 15, new work items (WIs) "Even further enhanced MTC for LTE (LTE_eMTC4)" [WI_eMTC] and "Further NB-IoT enhancements (NB_IOTenh2)" [WI_NBIOT] target eMTC and NB-IoT enhancements, respectively. In both of these WIs, a common goal is to reduce UE power consumption and latency through introducing possibilities to send data as early as possible during the Random Access (RA) procedure:

From [WI_eMTC]:
Support early data transmission [RAN2 lead, RAN1, RAN3]
 Evaluate power consumption/latency gain and specify necessary support for DL/UL data transmission on a dedicated resource during the RA procedure (after PRACH transmission and before the RRC connection setup is completed) at least in the RRC Suspend/Resume case.

And from [WI_NBIOT]:
Evaluate power consumption/latency gain and specify necessary support for DL/UL data transmission on a dedicated resource during the RA procedure after NPRACH transmission and before the RRC connection setup is completed. [RAN2, RAN1, RAN3]

During RAN2#99, several contributions on early data transmission (EDT) were discussed, and one of the agreements is to support early uplink (UL) data transmission in Msg4 for Rel-13 UP solution.

To facilitate the description of the presented solutions, the messages in the RA procedure are commonly referred to as message 1 (Msg1) through message 4 (Msg4). From TS36.300, the contention-based RA procedure is illustrated as in FIG. 1.

It is commonly agreed that EDT can be enabled for UL Msg3 only, or DL Msg4 only, or for both Msg3 and Msg4 depending on actual use cases. In existing solutions, the UE can indicate its intention of using EDT by the way it selects the preamble in Msg1. However, this requires some sort of preamble partitioning, which has negative impact on (N)PRACH performance.

The following agreements regarding preamble and PRACH resource partitioning/configuration and indication of Msg3 data sizes were made in RAN2#100:

The UE initiates EDT in Msg1 when the size of Msg3 including the user data, which UE intends to transmit, is equal or smaller than the maximum possible TBS size for Msg3 broadcast per CE.

PRACH partitioning for EDT indication is configured per enhanced coverage level.

Working assumption: Support for segmentation for this case is not prioritized.

Working assumption: PRACH resource partitioning is not supported to indicate the intended data size other than legacy or maximum TBS broadcast per CE.

FFS how to address the padding issue in Msg3.

UE category is not indicated in Msg1.

For EDT indication, PRACH resources can be configured as in legacy eMTC or NB-IoT with respect to physical layer resources, preambles/subcarriers.

PRACH resource pool, i.e. physical layer resources, preambles/subcarriers, for EDT indication is separate from PRACH resource pool for legacy RACH procedure.

To address concerns regarding Msg3 transmission and the possible need to include relatively large amount of padding in the case where the UL data size is very small, it is agreed to further discuss the issue.

The current information in the LTE-M grant included in RAR for Msg3 transmission includes the following [as specified in 3GPP TS 36.213]:

TABLE 1

| Information in MSG3 Transmission | | |
|---|---|---|
| DCI contents | CE mode A | CE mode B |
| Msg3 PUSCH narrowband index | $N_{NB}^{index}$ | 2 |
| Msg3 PUSCH Resource allocation | 4 | 3 |
| Number of Repetitions for Msg3 PUSCH | 2 | 3 |
| MCS | 3 | 0 |
| TBS | 0 | 2 |
| TPC | 3 | 0 |
| CSI request | 1 | 0 |
| UL delay | 1 | 0 |
| Msg3/4 MPDCCH narrowband index | 2 | 2 |
| Zero padding | $4 - N_{NB}^{index}$ | 0 |
| Total Nr-bits | 20 | 12 |

The current information in the NB-IoT grant included in RAR for Msg3 transmission includes the following [as specified in 3GPP TS 36.213]:

16.3.3 Narrowband Random Access Response Grant

The higher layers indicate the Nr-bit UL Grant to the physical layer, as defined in 3GPP TS 36.321. This is referred to as the Narrowband Random Access Response Grant in the physical layer.

Nr-bit=15, and the content of these 15 bits starting with the MSB and ending with the LSB are as follows:
  Uplink subcarrier spacing $\Delta f$ is '0'=3.75 kHz or '1'=15 kHz—1 bit
  Subcarrier indication field $I_u$ as determined in Subclause 16.5.1.1—6 bits
  Scheduling delay field ($I_{Delay}$) as determined in Subclause 16.5.1 with $k_0$=12 for $I_{Delay}$=0, where NB-IoT DL subframe n is the last subframe in which the NPDSCH associated with the Narrowband Random Access Response Grant is transmitted—2 bits
  Msg3 repetition number $N_{rep}$ as determine in Subclause 16.5.1.1—3 bits
  MCS index indicating TBS, modulation, and number of RUs for Msg3 according to Table 16.3.3-1—3 bits The redundancy version for the first transmission of Msg3 is 0.

In the RAN2 email discussion (100#38), it is identified that the padding issue should be resolved.

"Padding is done at the MAC sub-layer in the process of (re)building MAC PDU for Msg3, this section provides some background description on how UE's MAC sub-layer (re)builds Msg3 PDU according to corresponding UL grant(s) the UE has received. This aims to facilitate the discussion of the padding issue in Msg3 in EDT as well as possible solutions.

Currently, as specified in TS 36.321 Sections 5.1 and 5.4, the UE is provided with an UL grant in Msg2, i.e., RAR message to transmit Msg3. The MAC sub-layer builds Msg3 PDU based on data from CCCH logical channel submitted by the RLC sub-layer and then stores it in the Msg3 buffer. The MAC entity obtains the PDU from Msg3 buffer and instructs the PHY layer to generate a transmission of Msg3 according to the received UL grant. Once the UE transmits Msg3, it starts mac-ContentionResolutionTimer and monitors the (N)PDCCH for receiving either Msg4 or a UL grant for Msg3 retransmission. In case the contention resolution in Msg4 is considered unsuccessful, the UE restarts the RA procedure. Note that in the subsequent RA attempts, the UE obtains the Msg3 PDU from Msg3 buffer for transmission rather than building a new one. In case of Msg3 retransmission the eNB sends the UE a new UL grant via (N)PDCCH rather than a Msg4 (before the mac-ContentionResolution-Timer expires), the UE also obtains the PDU from Msg3 buffer for retransmission using the newly provided UL grant. In EDT, Msg3 MAC PDU may be larger or smaller than the provided UL grant. For example, when the UE receives the UL grant in Msg2 and realizes that the provided grant is not sufficient to accommodate the potential Msg3 PDU (i.e., including UL data). In this case, one possibility for UE is to fallback to transmitting legacy Msg3. However, the UL grant may be larger compared to legacy Msg3 size, resulting in unnecessary waste of resources due to padding bits. At the other extreme, UL resources may be wasted when the UL grant is larger than needed to accommodate all pending UL data. In addition, a similar situation can also happen when the UE receives a smaller or larger UL grant to (re)transmit the Msg3 PDU already stored in Msg3 buffer. This padding issue happen to some extent in both CP and UP EDT solutions.

Issue 1: UE is allocated with e.g. 1000-bit grant for Msg3 transmission, but the actual data size is relatively much smaller, for example only 100 bits.

Result: the payload of 100 bits+possible headers would be padded up to 1000 bits, potentially resulting in longer transmission time (thus higher power consumption, latency) and higher system resource consumption compared to what would be needed if the provided grant would be for smaller TBS. These issues are emphasized in deep coverage due to number of repetitions required. It is worth noting that especially uplink TX time considerably affects the UE power consumption.

Issue 2: UE is allocated with an UL grant larger than legacy one but not sufficient to accommodate the actual data size and the UE does a fallback to legacy Msg3.

Using a larger than required UL grant for legacy Msg3, padding is needed in Msg3 MAC PDU, resulting in higher power consumption (+latency) and system resource consumption compared to what would be needed if
  a smaller UL grant is provided,
  or UE not doing a fallback to legacy Msg3, for example, by using segmentation.

The latest agreements on this topic are listed below:
  For NB-IoT, RAN1 will select from the Rel-13 NPUSCH TBS values, and it is feasible to support at least 5 MCS/TBS/RU size combinations. (RU=resource unit).
  For eMTC, RAN1 will select from the Rel-13 PUSCH TBS values, and the maximum TBS for early data transmission in Msg3 is 1000 bits for PRACH CE levels 0 and 1 and 936 bits for PRACH CE levels 2 and 3.
  For NB-IoT, it has been agreed in RAN1 that:
    The number of MCS/TBS/RU states that can be used for EDT will be chosen from
      Limited MCS/TBS/RU states
        Alt. 0: 5 unused MCS/TBS/RU states and 0 bit in SIB
        Alt. 1: As many as supported by using 1 spare bit from RAR and 0 bit in SIB
        Alt. 2: As many as supported by using 2 spare bits from RAR and 0 bit in SIB
        Alt. 3: As many as supported by using 2 bits in SIB and 0 spare bit in RAR
        Alt. 4: As many as supported by using maximum TBS value in SIB and 0 spare bit in RAR
        Alt. 5: 1 spare bit in RAR used for new/modified UL grant and 0 bit in SIB
  From RAN1's point of view
    Uplink subcarrier spacing field, subcarrier indication field, scheduling delay field and Msg3 repetition number field in RAR UL Grant for uplink EDT in Msg3 do not need to be changed according to current RAN2 agreements.

The above applies to above Alts. 1-4

Further, there were some questions back to RAN2 which resulted in the following agreements in RAN2#101:

---

Agreements
Protocol overhead (MAC/RLC/PDCP/RRC) for EDT is assumed to be 25 bytes for TBS evaluations.
The minimum possible TB size is assumed to be around 320 bits based on the values in (N)PUSCH tables.
Agreements
If new UL grant format is defined, it does not need to be backwards compatible.
Same RAR format is used for EDT UEs.
Agreements
The EDT UL grant shall always allow the max TB size broadcasted in system information unless the provided UL grant is for legacy Msg3.
The EDT UL grant shall allow the UE to choose an appropriate TB size, MCS, repetitions, and RUs (for NB-IoT) from a set of TB sizes provided based on the UL data.
It is FFS how the set of possible TB sizes, MCS, repetitions, and RUs (for NB-IoT) is provided, e.g. hardcoded in the specs. This is pending RAN1 confirmation.
RAN2 assumes that 8 possible candidate values for the maximum TB size broadcasted in system information.
RAN2 assumes that for each maximum TB size broadcasted, up to 4 possible TB sizes, i.e. blind decoding options, are allowed.
For eMTC, the reserved bit in MAC RAR can be used for the EDT feature in eMTC only if it is necessary.
Send an LS reply to RAN1 capturing the agreements above including the agreement on the maximum and minimum possible TB sizes and ask RAN1 for confirmation.

---

As indicated in the last agreement, an LS (R2-1803884) has been sent to RAN1 to inform about these RAN2 agreement and confirm the agreements pending RAN1 confirmation.

Also related to this issue, the following agreements were made in RAN1#92:

Agreement
The maximum TBS broadcasted in system information are selected from 8 values which are taken from the Rel-13 PUSCH tables.
The up to 4 possible TBS which is smaller than or equal to the maximum broadcast TBS values for the UE to choose among are FFS. FFS: How the UE obtains the up to 4 possible values.

Agreement
Support NW enabling the use of TBS smaller than the maximum configured. FFS details.
The agreements are identical for NB-IoT and LTE-M apart from the use of 'PUSCH' or 'NPUSCH'.

SUMMARY

There currently exist certain challenges. As seen from the preceding agreements, it has been agreed that the maximum (max) TBS shall be broadcasted in system information (up to 8 values) and that the UE should be able to autonomously select a transport block size (TBS) in a set of up to 4 TBSs up to this maximum value. However, no solutions have been provided on how to support the many different combinations with the limitation that the UL grant must maintain the same size.

Certain aspects of the present disclosure and their embodiments may provide solutions to these or other challenges. In certain embodiments, a solution is proposed for the UE-autonomous TBS selection over up to 4 TBSs based on the number of TBS candidates broadcasted in System Information (SI). With use of the Early Data Transmission feature, there may be a contention-based transmission of the payload, e.g., there is a risk for collision with other UEs, which can lead to high numbers of retransmissions and congestion upon high load in a cell. Certain embodiments described herein provide a dynamic way to switch on and off the Early Data Transmission in a cell, e.g. depending on load, to avoid this drawback.

According to an embodiment, a method is performed by a wireless device for early data transmission. The method comprises receiving a broadcast from a network node. The broadcast indicates a maximum transport block size for early data transmission and a number of transport block size candidates. The method further comprises selecting a transport block size for early data transmission. The transport block size is selected based on a table entry that corresponds to the maximum transport block size and the number of transport block size candidates. The method further comprises transmitting uplink data in one or more transport blocks. Each transport block has the selected transport block size.

According to another embodiment, a computer program product includes a non-transitory computer readable medium storing computer readable program code. The computer readable program code comprises program code operable to perform the above method.

According to yet another embodiment, a wireless device comprises a memory configured to store instructions and processing circuitry configured to execute the instructions. The wireless device is configured to receive a broadcast from a network node. The broadcast indicates a maximum transport block size for early data transmission and a number of transport block size candidates. The wireless device is further configured to select a transport block size for early data transmission. The transport block size is selected based on a table entry that corresponds to the maximum transport block size and the number of transport block size candidates. The wireless device is further configured to transmit uplink data in one or more transport blocks. Each transport block having the selected transport block size.

In certain embodiments, the method/wireless device/computer program product may have one or more additional and/or optional features, such as one or more of the following:

In particular embodiments, the table entry indicates one or more transport block sizes available to the wireless device.

In particular embodiments, the method/wireless device/computer program product further determines a number of resource units or a number of repetitions for transmission based on the selected transport block size.

In particular embodiments, the method/wireless device/computer program product determines a number of resource units and/or a number of repetitions for transmission based on the selected transport block size or based on a code rate associated with the maximum transport block size.

In particular embodiments, the method/wireless device/computer program product further receives a message comprising a random-access response for each transport block size associated with the table entry from which the transport block size is selected. The method/wireless device/computer readable program transmits a response to the network node according to an uplink grant. The uplink grant was received in the random-access response that corresponds to the selected transport block size. In particular embodiments, the received broadcast is a system information (SI) broadcast.

According to an embodiment, a method is performed by a network node for early data transmission. The method comprises: determining a maximum transport block size for early data transmission and a number of transport block size candidates; broadcasting the determined maximum transport block size and the number of transport block size candidates; and receiving an early data transmission comprising one or more transport blocks; and decoding the early data transmission by decoding the one or more transport blocks according to available transport block sizes indicated in the table entry. The one or more transport blocks all have a transport block size selected based on a table entry corresponding to the maximum transport size and the indicated number of transport block size candidates. The method further comprises.

According to another embodiment, a computer program product includes a non-transitory computer readable medium storing computer readable program code. The computer readable program code comprises program code operable to perform the method immediately above.

According to another embodiment, a network node comprises a memory configured to store instructions and processing circuitry configured to execute the instructions. The network node is configured to: determine a maximum transport block size for early data transmission and a number of transport block size candidates, broadcast the determined maximum transport block size and the number of transport block size candidates; receive an early data transmission comprising one or more transport blocks; and decode the early data transmission by decoding the one or more transport blocks according to available transport block sizes indicated in the table entry. The one or more transport blocks all have a transport block size selected based on a table entry corresponding to the maximum transport size and the indicated number of transport block size candidates. The network node is further configured to.

In certain embodiments, the method/network node/computer program product may have one or more additional and/or optional features, such as one or more of the following:

In particular embodiments, the method/network node/computer program product transmit a message comprising a random-access response for each of the one or more available transport block sizes indicated in the table entry.

In particular embodiments, the method/network node/computer program product indicate a code rate for early data transmission associated with the maximum transport block size. A number of resource units or a number of repetitions for the received early data transmission is based on the indicated code rate.

In particular embodiments, the received broadcast is a system information (SI) broadcast.

Certain embodiments may provide one or more of the following technical advantages. For example, certain embodiments enable more flexibility in the selection of combination TB size, number of resource units/repetitions, number of TBS candidates. The added flexibility may help reduce unnecessary retransmissions and congestion in a cell. As a result, latency may be reduced and additional bandwidth may be available to users. As another example, certain embodiments provide techniques for selecting a transport block size based on a maximum transport block size and number of candidate sizes indicated by the network node. In this manner, a wireless device may select a determinable transport block size for early data transmission.

Certain embodiments may have none, some, or all of the above-recited advantages. Other advantages may be readily apparent to one having skill in the art.

BRIEF DESCRIPTION OF THE DRAWINGS

For a more complete understanding of the disclosed embodiments and their features and advantages, reference is now made to the following description, taking in conjunction with the accompanying drawings, in which.

DETAILED DESCRIPTION

Figure 1:
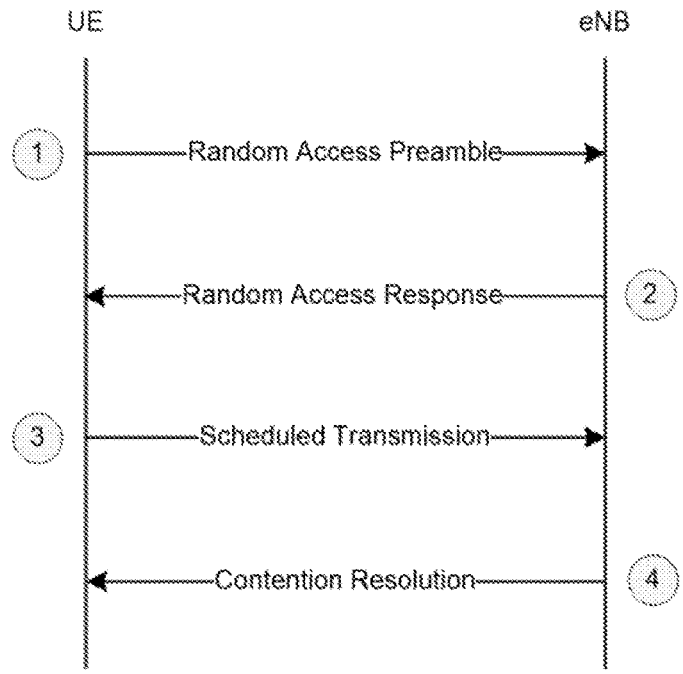
FIG. 1 illustrates an example signalling diagram for contention-based random access procedure between a user equipment and a network node.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The number of TBS candidates the UE can choose from is connected to the eNB processing capability since it needs to do blind decoding for each TBS included. For example, the eNB may not know which TBS is selected from the candidates, and therefore must attempt to decode for each TBS candidate until the correct decoding is completed. This capability may change dynamically, e.g., the network node has more available resources to attempt blind decoding at a later time. In certain embodiments, the number of TBS candidates may be included in an information element (IE) in SI, for example in a system broadcast, e.g., SIB2, as follows:

EDT-TBSselection-NB-r15 ENUMERATED {n1, n2, n3, n4} OPTIONAL—Need OR

In certain embodiments, this number may be used with a signalled maximum TBS for EDT to determine a set of candidate TBSs for the wireless device to use in early data transmission. The TBSs that the UE can choose from could be determined by a table, according to certain embodiments. One example of such is given below. In particular, the table may be a two-dimensional table with entries defined by a number of TBS candidates signalled by the broadcast ($n_i$ in Table 2, e.g., ranging from 1 to 4, but may include numbers exceeding 4) and a maximum TBS signalled in the broadcast, e.g., 320 bits, 424 bits, . . . , 1000 bits, etc. (as shown in the column headings of Table 2). Thus, based on the combination of these parameters, $n_i$ and maximum TBS, one of the table entries may be identified. For example, if $n_i$=3 and maximum TBS=808, then the table entry in row "3" and column "808" may be indicated. Accordingly, the available TBSs would be 320, 616, and 808. In this manner, the wireless device may be provided with a limited choice of TBSs to select from based on a predefined table. Although Table 2 illustrates certain values of $n_i$ and values of the maximum TBS in the broadcast, any suitable values of $n_i$ and maximum TBS are contemplated herein.

TABLE 2

Multiple-choice TBS selection sets

| $n_i$: | 320 | 424 | 504 | 616 | 712 | 808 | 936 | 1000 |
|---|---|---|---|---|---|---|---|---|
| 4 | — | — | — | {320, 424, 504, 616} | {320, 424, 616, 712} | {320, 504, 616, 808} | {320, 504, 712, 936} | {320, 504, 808, 1000} |
| 3 | — | — | {320, 424, 504} | {320, 504, 616} | {320, 504, 712} | {320, 616, 808} | {320, 616, 936} | {320, 616, 1000} |
| 2 | — | {320, 424} | {320, 504} | {320, 616} | {424, 712} | {424, 808} | {504, 936} | {504, 1000} |

In certain embodiments, the values may be bit aligned to existing (N)PUSCH TB sizes and the range for each set may be optimized to minimize the amount of padding. For example, the available TBS sizes may range from a minimum of 320 bits to the maximum TBS signalled. This may minimize the number of "unused bits" (e.g., padding), e.g., for a random and uniform distribution of UL payload sizes. Note that the smaller TBS values in Table 2 need not be restricted to the 8 maximum EDT TBS sizes. For example, one or more of the TBS values the UE may choose from may be different from the 8 maximum EDT TBS sizes.

In addition to the TBS size, the UL grant may indicate the resource allocation, number of resource units (RUs)/repetitions, MCS, etc. In some embodiments, the resource allocation, RUs, repetitions, MCS are indicated explicitly by the UL grant. In some embodiments, the resource allocation, RUs, repetition, MCS are indicated indirectly by the UL grant. Notably, these may be only indicated for a single TBS in Release 13 operation. In certain embodiments, the UL grant size is the same, e.g., these fields may only be indicated for one TBS. Accordingly, in certain embodiments a pre-defined mapping (e.g. a hard-coded table in specs, or semi-statically configured in SI) may be defined to determine how to map these parameters to other TBSs. For example, if for NB-IoT the number of RUs for the maximum TBS is indicated dynamically in DCI and the number of TBS candidates ('NR TBSs' below) is signalled in SI, the UE may determine how many RUs it should apply if a smaller TBS than the maximum is selected. In some embodiments, this could be defined by the following table in this case:

TABLE 3

TBS and RU Correlation

| Nr TBSs: | |
|---|---|
| 4 | {$TB_1$, $TB_{1/3}$, $TB_{2/3}$, $TB_{max}$} RUs*{1/8, 1/4, 1/2, 1} |
| 3 | {$TB_1$, $TB_{1/2}$, $TB_{max}$} RUs*{1/8, 1/3, 1} |
| 2 | {$TB_1$, $TB_{max}$} RUs*{1/8, 1} |
| 1 | {$TB_{max}$} RUs*{1} |

Table 3 above serves only as a non-limiting example. For LTE-M, the number of RUs may be replaced by a number of repetitions applied for Coverage Enhancement. In the example above, the number of RUs is defined as a fraction of that of the maximum TBS, but for practical use this would may be a rounded value within the standardized range of RUs. In some embodiments, an exact number of RUs or another parameter is directly included in a table, like Table 3, instead of an applied fraction or multiplier.

Accordingly, certain embodiments achieve similar code rates for each TB size with its corresponding RUs. As a result, the eNB can expect similar decoding performance of each of the Transport Blocks. Thus, in certain embodiments, link adaptation may be achieved by signalling the code rate (effectively through the number of RUs or repetitions) for the maximum TBS only.

Even though only a code rate may only be signalled for a single TBS, e.g., the maximum TBS, the UE may still be able to determine which number of RUs or repetitions should be applied for different TBS values, e.g., smaller TBS values than the maximum. For example, if a smaller TBS than the maximum TBS is selected, the number of RUs or repetitions may be chosen to maintain a similar or the same code rate that was signalled for the maximum TBS.

As agreed, the eNB should dynamically be able to indicate a fall back to Rel-13 UL grant/TB S:

"The EDT UL grant shall always allow the max TB size broadcasted in system information unless the provided UL grant is for legacy Msg3."

In certain embodiments, this may be achieved by the eNB indicating a legacy Rel-13 TBS in the new Rel-15 EDT scheme. For example, the eNB may indicate a TBS of 88 bits for NB-IoT.

For LTE-M, this is more difficult because the Msg3 TBS can be in a wide range (from 16 to 712 bits, but practically from 56 to 712 bits) which requires more signalling bits. In certain embodiments, one TBS is provided for fall-back to legacy, but the TBS is not hard-coded but semi-statically set in SI. For example:

EDT-TBSlegacy-r15 ENUMERATED {56, 72, . . . , 712} OPTIONAL—Need OR

According to certain embodiments, the Medium Access Control Random Access (MAC RA) response Protocol Data Unite (PDU) includes a RAR for each TBS candidate available to be selected based on the broadcast parameters, i.e., the number of TBS candidates and the maximum TBS. For example, if the number of TBS candidates ($n_t$ or 'Nr TBSs' above) is 2, the eNB would respond to an EDT transmission from the UE with two RARs corresponding to the same Random Access Preamble ID (RAPID) corresponding to the UE. As another example, if $n_t$=3, then the eNB may include three RARs, one for each available TBS that may be selected by the wireless device, and all three RARs including the same RAPID. Accordingly, the number of RARs with the same RAPID may equal the number of candidate TBSs indicated in the broadcast.

In certain embodiments, the order of appearance may be the same as the TBSs are listed. For example, if the available TBSs are 320 bits and 424 bits based on $n_t$=2 and maximum TBS=424 (e.g., as shown in example Table 2 above), the eNB may respond with two RARs that have a TBS of 320 bits and 424 bits respectively. They may be ordered from smallest TBS to largest TBS or from largest to smallest TBS. Accordingly, the UE may anticipate which RAR to expect to match the selected TBS. For example, if the UE knows that the MAC PDU will include two RARs with its RAPID and knows which RAR corresponds to which TBS based on its order, the UE may determine that the first RAR (or second RAR) is the RAR with the matching TBS and proceed to decode the correct RAR without attempting to decode the other RAR.

Figure 2:
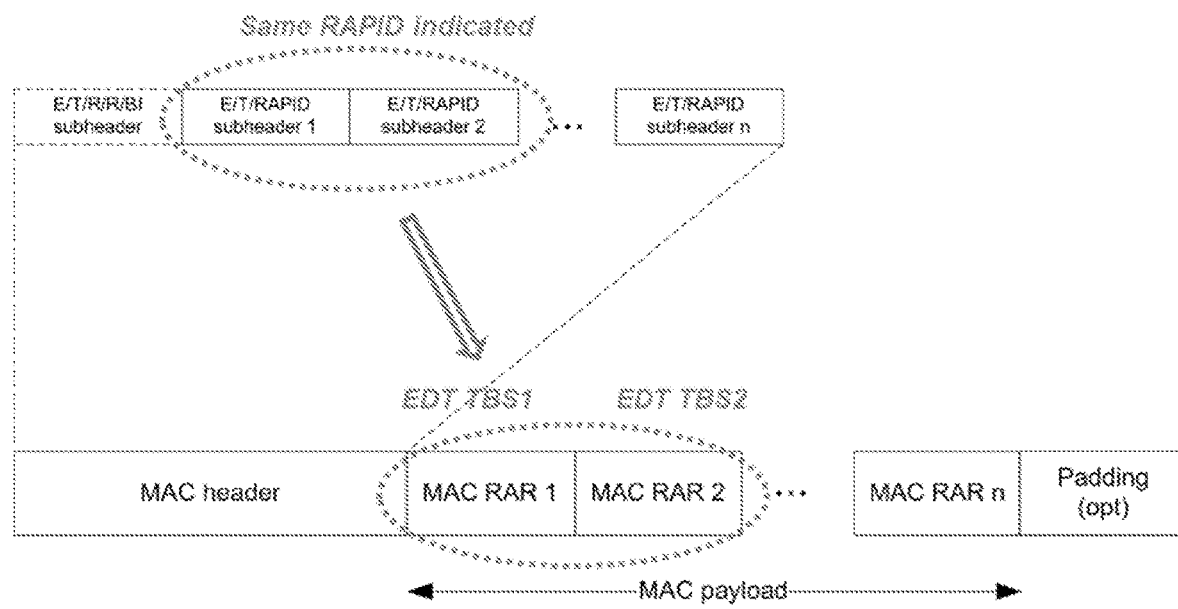
FIG. 2 illustrates an example structure of a medium access control (MAC) payload and header with multiple subheaders indicating the same preamble for multiple random access responses with different transport block sizes.

A non-limiting example is given in FIG. 2 for the case where $n_t$=2 is indicated in system information (SI) for a control element (CE)-level and correspondingly the UE has transmitted an EDT preamble for this CE-level. In response, the eNB constructed a MAC payload including two RARs corresponding to the two available TBSs. As discussed above, both the UE and eNB may determine which TBSs are available for EDT based on the parameters number of candidate TBSs and maximum TBS broadcast in the system information. The two RARs are indicated in FIG. 2 as MAC RAR 1 and MAC RAR 2 and labelled EDT TBS1 and EDT TBS2 to indicate the different TBSs used for each RAR. In certain embodiments, the same RAPID is indicated in the corresponding subheaders for each RAR corresponding to the EDT of the UE. In particular, FIG. 2 illustrates subheader 1 and subheader 2 having the same RAPID, even though they correspond to the two different RARs, MAC RAR 1 and MAC RAR 2. In this manner, the UE may determine that both RARs are intended for the UE and the UE can decode the RAR corresponding to the selected TBS, as discussed earlier. In this manner, an eNB may ensure that a RAR with a matching TBS to the selected TBS is transmitted in response to a UE's EDT transmission with the matching RAPID.

Note that in these embodiments, the Msg2 size may be increased, but the solution is fully flexible and as dynamic as the existing techniques since there may be a separate UL grant for each TBS from which the UE can select. In this manner, the eNB may provide the UE with RARs for each candidate TBS. Thus, regardless of which TBS is chosen by the UE, a RAR matching the selected TBS is chosen.

Figure 3:
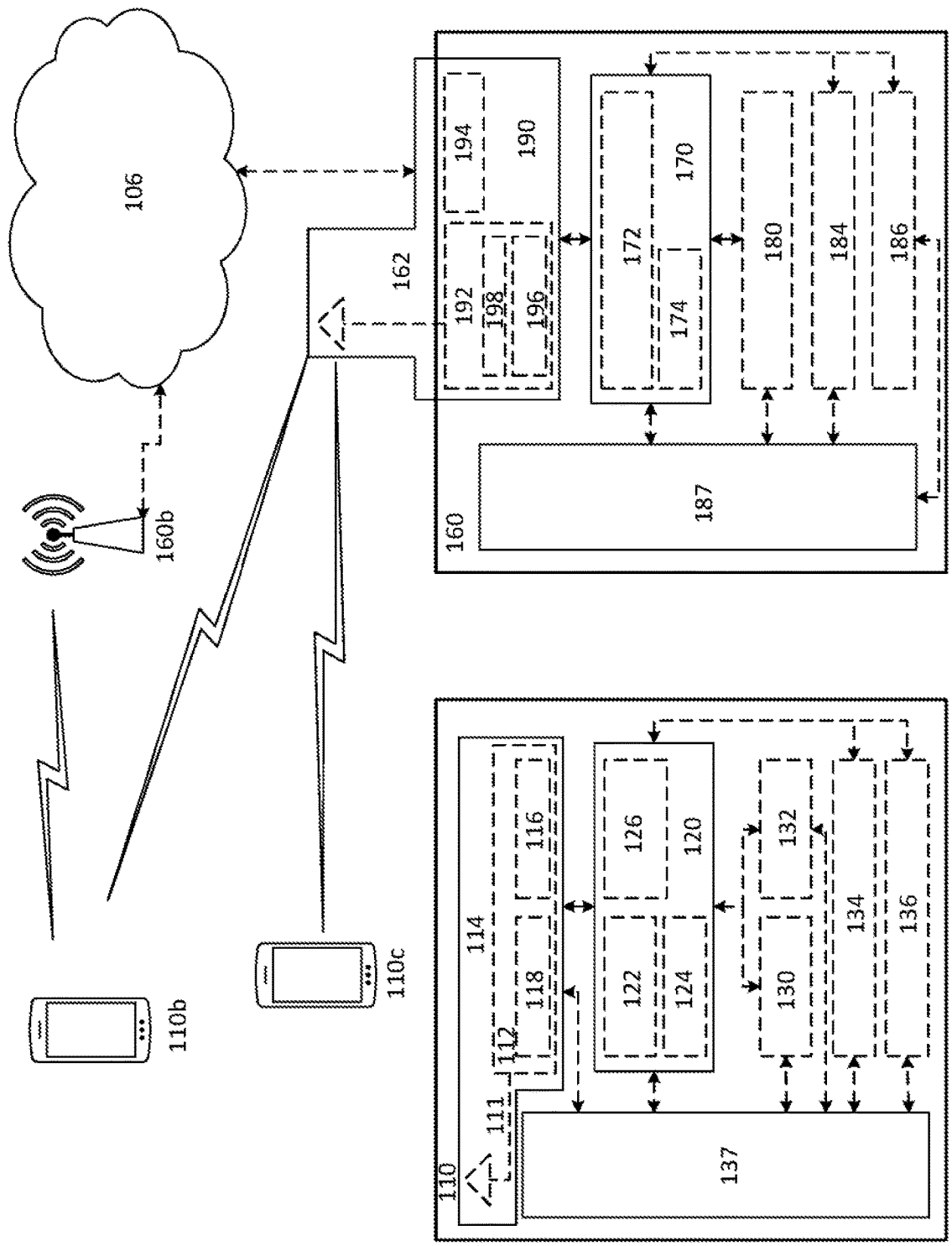
FIG. 3 illustrates an example wireless network, in accordance with certain embodiments.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 4:
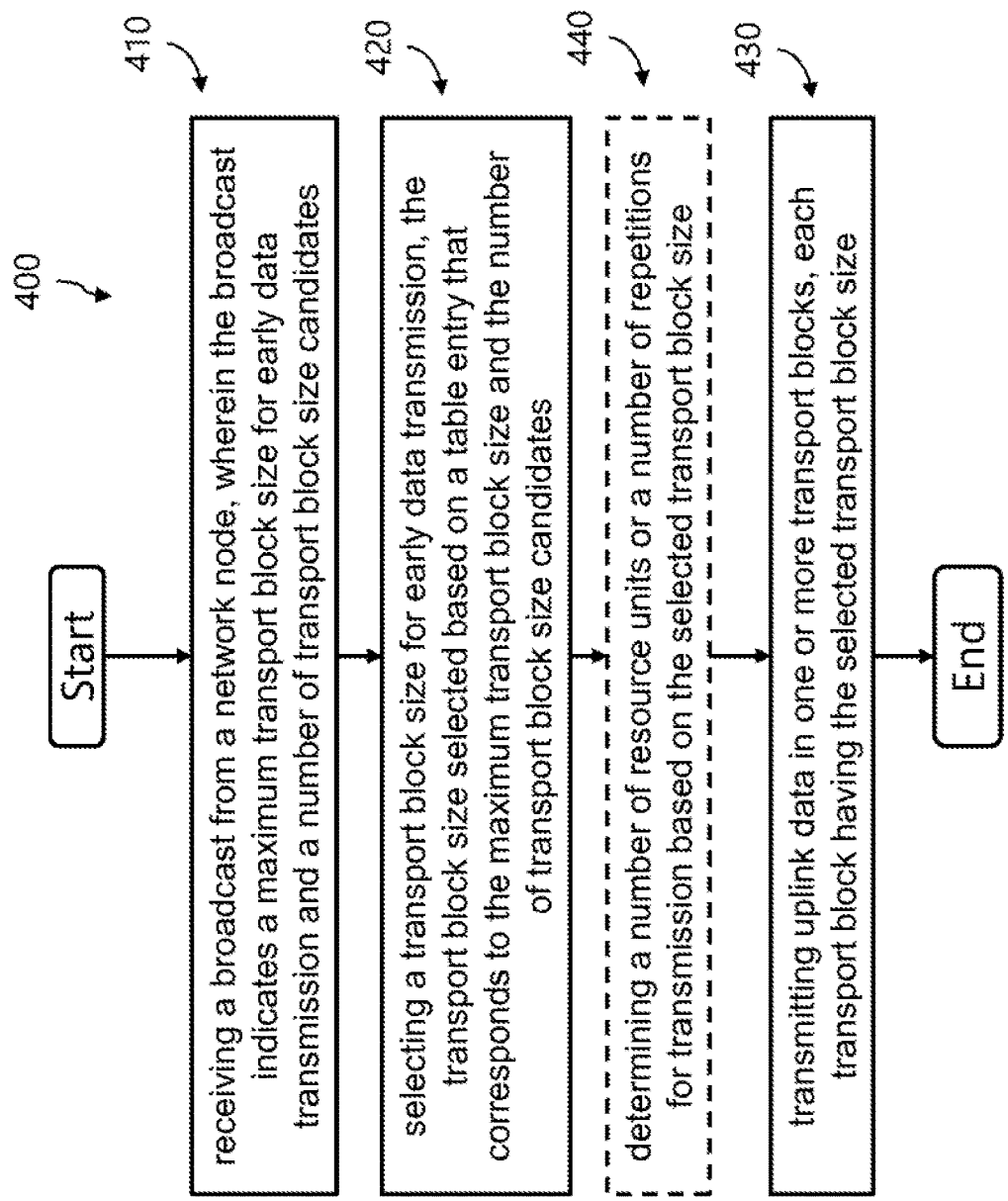
FIG. 4 illustrates an example method performed by a wireless device, in accordance with certain embodiments.

FIG. 4 illustrates an example flowchart for a method 400 for use in a wireless device, such as such as wireless device 110*b* or 110*c* described above in reference to FIG. 3. Method 400 may begin at step 410, wherein a broadcast is received from a network node, such as network node 160 described above in reference to FIG. 3. The broadcast indicates a maximum transport block size for early data transmission and a number of transport block size candidates. For example, the broadcast may be a system information broadcast that indicates an explicit maximum TBS size and an indication of a number, e.g., numbers 1, 2, 3, 4 or other indication mapping to a numerical value, of the number of potential TBS candidates the wireless device may choose from. For example, if the network node has little available resources, it may indicate a low number of TBS candidates, e.g., 1 or 2, so that it reduces the amount of blind decoding needed to receive the early data transmission.

At step 420, the wireless device may select a TBS size for EDT. The transport block size is selected based on a table entry that corresponds to the maximum transport block size and the number of transport block size candidates. In certain embodiments, the table entry indicates one or more transport block sizes available to the wireless device. For example, each combination of possible maximum TBSs and number of candidates may have associated with certain TBS values. These associations may be stored in a table, such as Table 2 illustrating an example multiple-choice TBS selection table. This table may be stored in memory of the wireless device or otherwise accessible over the network. For example, periodic updates may update the particular TBS candidate table for the network, cell, set of network nodes, etc. In the above examples described herein, the "table entry" refers to any entry in a table or other data structure that may be stored or accessible in a wireless device.

At step 430, the wireless device may transmit uplink data in one or more transport blocks. Each transport block has the selected transport block size. In this manner, the wireless device may suitably communicate data in an early data transmission in a predictable manner that balances the resources of the wireless device and the network node.

In certain embodiments, method 400 may include one or more additional or optional steps or substeps. In a particular embodiment, method 400 may include an optional step 440, wherein the wireless device determines a number of resource units or a number of repetitions for transmission based on the selected transport block size. For example, the wireless device may determine a number of resource units that maintains a particular code rate or other quality of service parameter based on the selected TBS size. In particular, if a smaller TBS than the indicated maximum TBS is chosen, the number of resource units may be scaled accordingly, e.g., as exemplified in Table 3 above. In some embodiments, the number of resource units and/or number of repetitions may be based on a code rate associated with the maximum TBS. In this manner, even if the network node only indicates a single resource unit or repetition value for the maximum TBS, the wireless device may be able to determine a suitable number of resource units and/or repetitions for the TBS it has selected.

According to certain embodiments, a network node receiving the early data transmission may respond to the EDT with one or more random access responses (RARs). In certain embodiments, the wireless device receives a message comprising a RAR for each TBS associated with the table entry from which the TBS is selected. For example, to ensure that the wireless device receives a RAR with the correct TBS size with the corresponding RAPID, the network node may construct multiple RARs for each candidate TBS (e.g., based on the shared table with candidate TBSs based on the maximum TBS and number of candidates indicated in the broadcast). The wireless device may further receive a header that includes a subheader for each received RAR. The multiple RARs for each candidate TBS may include the same RAPID, such that the wireless device may identify the correct RAR. In response, the wireless device may transmit a response according to an uplink grant, wherein the uplink grant was received in the random-access response that corresponds to the selected transport block size.

Figure 5:
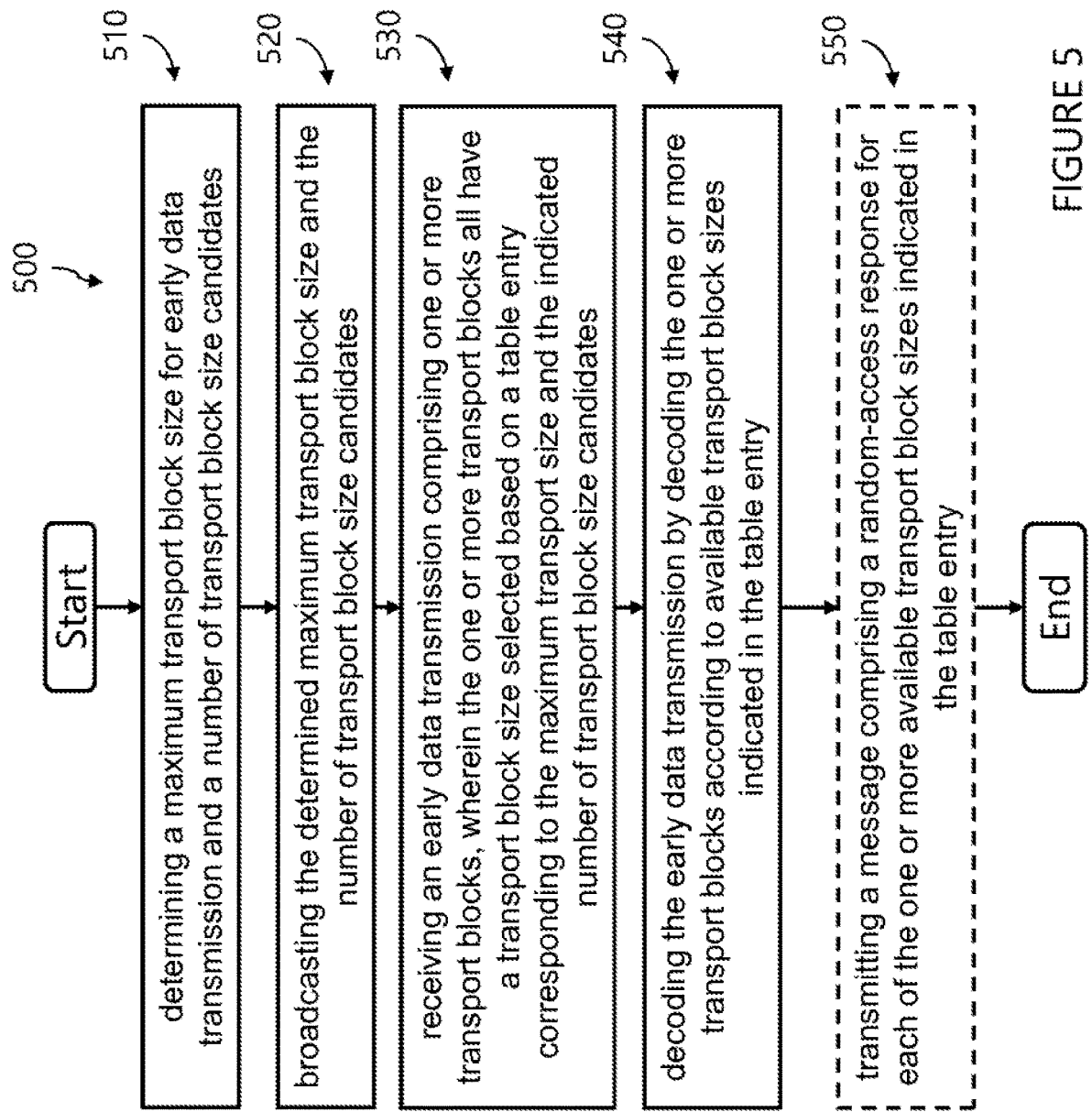
FIG. 5 illustrates an example method performed by a network node, in accordance with certain embodiments.

FIG. 5 illustrates an example flowchart for a method 500 for use in a network node, such as network node 160 as described above in reference to FIG. 3. Method 500 may begin at step 510, wherein the network node determines a maximum transport block size for early data transmission and a number of transport block size candidates. The maximum TBS and number of TBS candidates may be based on a variety of factors such as the network conditions proximate the network node, the number of existing connections, the quality of service requirements for the network or cell served by the network node, etc.

After the maximum TBS and number of candidates are determined, at step 520, the network node may broadcast the determined maximum transport block size and the number of transport block size candidates. In certain embodiments, these determined parameters may be broadcast in a system information broadcast. In this manner, these parameters may be accessible to all wireless devices within range, including devices that have yet to perform any access procedure, such as a contention-based random-access procedure depicted in FIG. 1 above.

At step 530, the network node receives an early data transmission comprising one or more transport blocks. The one or more transport blocks all have a transport block size, but may be different from the maximum TBS size indicated in the broadcast. In particular, the TBS size may be selected based on a table entry corresponding to the maximum transport size and the indicated number of transport block size candidates. As discussed above, the wireless device may be able to determine a TBS based on the same table entry. Accordingly, the network node may expect only a limited number of TBSs for EDT.

At step 540, the early data transmission is decoded by decoding the one or more transport blocks according to available transport block sizes indicated in the table entry. For example, the network node may blind decode the transmission because it does not know previously what TBS was selected by the wireless device. The network node, however, may limit the amount of blind decoding based on the indicated maximum TBS and number of candidates. For example, the indicated parameters may only correspond to a single available TBS in the table entry. Therefore, the network node only needs to decode using that single TBS. Alternatively, the parameters correspond to more than one available TBS, but regardless, the network node may limit its blind decoding to that limited set of TBS, thereby reducing the number of wasted resources.

In certain embodiments, method 500 may include one or more additional or optional steps or substeps. In a particular embodiment, method 500 may include an optional step 550, wherein the network node transmits a message comprising a random-access response for each of the one or more available transport block sizes indicated in the table entry. As discussed above in reference to FIG. 2, the message may include multiple RARs for each candidate TBS (e.g., those indicated in the table entry according to the maximum TBS and number of candidates). Further, the header of the message may include a subheader for each RAR that each have the same RAPID corresponding to the wireless device from which the network node has received the EDT. In this manner, it is ensured that the wireless device will receive a RAR that has the correct RAPID with its chosen TBS.

In certain embodiments, the network node may further indicate a code rate for early data transmission associated with the maximum transport block size. For example, the network node may indicate a code rate explicitly or indirectly for only the maximum TBS. A number of resource units or a number of repetitions for the received early data transmission is based on the indicated code rate. For example, if the maximum TBS is chosen by the wireless device the number of resource units or repetitions may correspond to the code rate indicated by the network node. If, however, another smaller TBS is chosen, as described above, then a number of resource units or repetitions may still be based on the indicated code rate but adjusted based on the different TBS. For example, the number of resource units or repetitions may be scaled based on the relative size of the chosen TBS and the maximum TBS.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

The invention claimed is:

1. A method performed by a wireless device for early data transmission, the method comprising:
   receiving a broadcast from a network node, wherein the broadcast indicates a maximum transport block size for early data transmission and a number indicating how many transport block size candidates are associated with the maximum transport block size;
   selecting a transport block size for early data transmission, the transport block size selected based on a table entry that corresponds to the maximum transport block size as a first table entry indicator and the number of transport block size candidates as a second table entry indicator, wherein the number of transport block size candidates is associated with the maximum transport block size, wherein the first table entry indicator is one of a row indicator or a column indicator that leads to the selected table entry, and the second table indicator is another one of the row indicator or the column indicator; and
   transmitting uplink data in one or more transport blocks, each transport block having the selected transport block size.

2. The method of claim 1, wherein the table entry indicates one or more transport block sizes available to the wireless device.

3. The method of claim 1, further comprising determining a number of resource units or a number of repetitions for transmission based on the selected transport block size.

4. The method of claim 1, further comprising determining a number of resource units and a number of repetitions for transmission based on the selected transport block size.

5. The method of claim 1 further comprising determining a number of resource units or a number of repetitions based on a code rate associated with the maximum transport block size.

6. The method of claim 1, further comprising:
   receiving a message comprising a random-access response for each transport block size associated with the table entry from which the transport block size is selected; and
   transmitting a response to the network node according to an uplink grant, wherein the uplink grant was received in the random-access response that corresponds to the selected transport block size.

7. The method of claim 1, wherein the received broadcast is a system information (SI) broadcast.

8. A method performed by a network node for early data transmission, the method comprising:
   determining a maximum transport block size for early data transmission and a number indicating how many transport block size candidates are associated with the maximum transport block;
   broadcasting the determined maximum transport block size and the number of transport block size candidates;
   receiving an early data transmission comprising one or more transport blocks, wherein the one or more transport blocks all have a transport block size selected based on a table entry corresponding to the maximum transport size as a first table entry indicator and the indicated number of transport block size candidates as a second table entry indicator, wherein the number of transport block size candidates is associated with the maximum transport block size, wherein the first table entry indicator is one of a row indicator or a column indicator that leads to the selected table entry, and the second table indicator is another one of the row indicator or the column indicator; and
   decoding the early data transmission by decoding the one or more transport blocks according to available transport block sizes indicated in the table entry.

9. The method of claim 8, further comprising transmitting a message comprising a random-access response for each of the one or more available transport block sizes indicated in the table entry.

10. The method of claim 8, further comprising indicating a code rate for early data transmission associated with the maximum transport block size, wherein a number of resource units or a number of repetitions for the received early data transmission is based on the indicated code rate.

11. The method of claim 8, wherein the received broadcast is a system information (SI) broadcast.

12. A wireless device comprising:
    a memory configured to store instructions; and
    processing circuitry configured to execute the instructions; wherein the wireless device is configured to:
      receive a broadcast from a network node, wherein the broadcast indicates a maximum transport block size for early data transmission and a number indicating how many transport block size candidates are associated with the maximum transport block size;
      select a transport block size for early data transmission, the transport block size selected based on a table entry that corresponds to the maximum transport block size as a first table entry indicator and the number of transport block size candidates as a second table entry indicator, wherein the number of transport block size candidates is associated with the maximum transport block size, wherein the first table entry indicator is one of a row indicator or a column indicator that leads to the selected table entry, and the second table indicator is another one of the row indicator or the column indicator; and
      transmit uplink data in one or more transport blocks, each transport block having the selected transport block size.

13. The wireless device of claim 12, wherein the table entry indicates one or more transport block sizes available to the wireless device.

14. The wireless device of claim 12, wherein the wireless device is further configured to determine a number of resource units or a number of repetitions for transmission based on the selected transport block size.

15. The wireless device of claim 12, wherein the wireless device is further configured to determine a number of resource units and a number of repetitions for transmission based on the selected transport block size.

16. The wireless device of claim 12, wherein the wireless device is further configured to determine a number of resource units or a number of repetitions based on a code rate associated with the maximum transport block size.

17. The wireless device of claim 12, wherein the wireless device is further configured to:

receive a message comprising a random-access response for each transport block size associated with the table entry from which the transport block size is selected; and transmit a response to the network node according to an uplink grant, wherein the uplink grant was received in the random-access response that corresponds to the selected transport block size.

18. The wireless device of claim 12, wherein the received broadcast is a system information (SI) broadcast.

19. A network node comprising:
a memory configured to store instructions; and
processing circuitry configured to execute the instructions, wherein the network node is configured to:
    determine a maximum transport block size for early data transmission and a number indicating how many transport block size candidates are associated with the maximum transport block size;
    broadcast the determined maximum transport block size and the number of transport block size candidates;
    receive an early data transmission comprising one or more transport blocks, wherein the one or more transport blocks all have a transport block size selected based on a table entry corresponding to the maximum transport size as a first table entry indicator and the indicated number of transport block size candidates as a second table entry indicator, wherein the number of transport block size candidates is associated with the maximum transport block size, wherein the first table entry indicator is one of a row indicator or a column indicator that leads to the selected table entry, and the second table indicator is another one of the row indicator or the column indicator; and
    decode the early data transmission by decoding the one or more transport blocks according to available transport block sizes indicated in the table entry.

20. The network node of claim 19, wherein the network node is further configured to transmit a message comprising a random-access response for each of the one or more available transport block sizes indicated in the table entry.

21. The network node of claim 19, wherein the network node is further configured to indicate a code rate for early data transmission associated with the maximum transport block size, wherein a number of resource units or a number of repetitions for the received early data transmission is based on the indicated code rate.

22. The network node of claim 19, wherein the received broadcast is a system information (SI) broadcast.

* * * * *